Oct. 5, 1965

T. DE VOS ETAL 3,210,693

WAVEGUIDE BRANCHING FILTER HAVING
COMPENSATING CAVITIES

Filed Dec. 20, 1962

*INVENTORS*
Thomas De Vos
Per S. Skullestad

BY

ATTY.

United States Patent Office 3,210,693
Patented Oct. 5, 1965

3,210,693
WAVEGUIDE BRANCHING FILTER HAVING COMPENSATING CAVITIES
Thomas de Vos, Sunnyvale, and Per S. Skullestad, Redwood City, Calif., assignors, by mesne assignments, to Automatic Electric Laboratories, Inc., Northlake, Ill., a corporation of Delaware
Filed Dec. 20, 1962, Ser. No. 246,202
9 Claims. (Cl. 333—9)

This invention relates to a waveguide matching arrangement, and more particularly to an arrangement for matching wide pass-band channelizing filters, closely spaced in frequency.

In the past, the matching of a branching filter was, in general, not considered to be of great difficulty. A matched branching filter is a branching filter that provides a relatively low standing wave ratio for RF energy at frequencies outside of the pass band of the filter. The pass bands of the branching filters were usually relatively narrow. This allows close channel spacings in a multiplexing system without interaction between filters. See for example, "Principles and Applications of Waveguide Transmission," G. Southworth, D. Van Nostrand Company, Inc. (1950), at pp. 311–12. In instances where it was felt that some matching device would be desirable to provide a relatively better match for the branching filter, matching pins or ridges internal to the waveguide were utilized. Without the use of a matching device in conjunction with a branching filter, only a narrow pass-band filter can be used with channels that are not too closely spaced in frequency. With a wider pass band the loaded Q of the first cavity in a maximally-flat branching filter usually becomes lower, and the match to the frequencies outside of the band pass of the filter becomes less desirable. Furthermore, pin or ridge matching is frequency dependent, and functions properly only over a limited frequency band. These matching devices are also mechanically complex if used in connection with a relatively wide pass-band filter.

The principal object of this invention, is therefore, the provision of an arrangement for matching a wide pass band branching filter which attains a high degree of simplicity, performance and stability, both mechanically and electrically, and is not frequency dependent.

According to the invention, a waveguide matching arrangement is provided using a waveguide cavity connected to the main waveguide at a distance of an odd number of quarter guide wave lengths from the wide pass-band branching filter. This cavity creates a match for the RF energy being rejected by the pass-band filter, and is not frequency dependent due to its inherent characteristics. Since the matching cavity is of the same basic construction as the filter cavities, the relative frequency drift between the matching cavity and the filter cavities due to changes in temperature is negligible.

The above-mentioned and other objects and features of this invention and the manner of attaining them will become more apparent, and the invention itself will be best understood, by reference to the following description of an embodiment of the invention taken in conjunction with the accompanying drawings comprising FIGS. 1–3 wherein.

Figure 1:
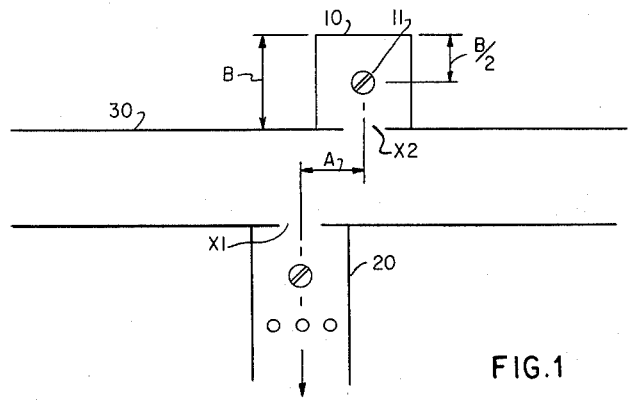
FIG. 1 is a symbolic diagram of a waveguide matching arrangement.
Figure 2:
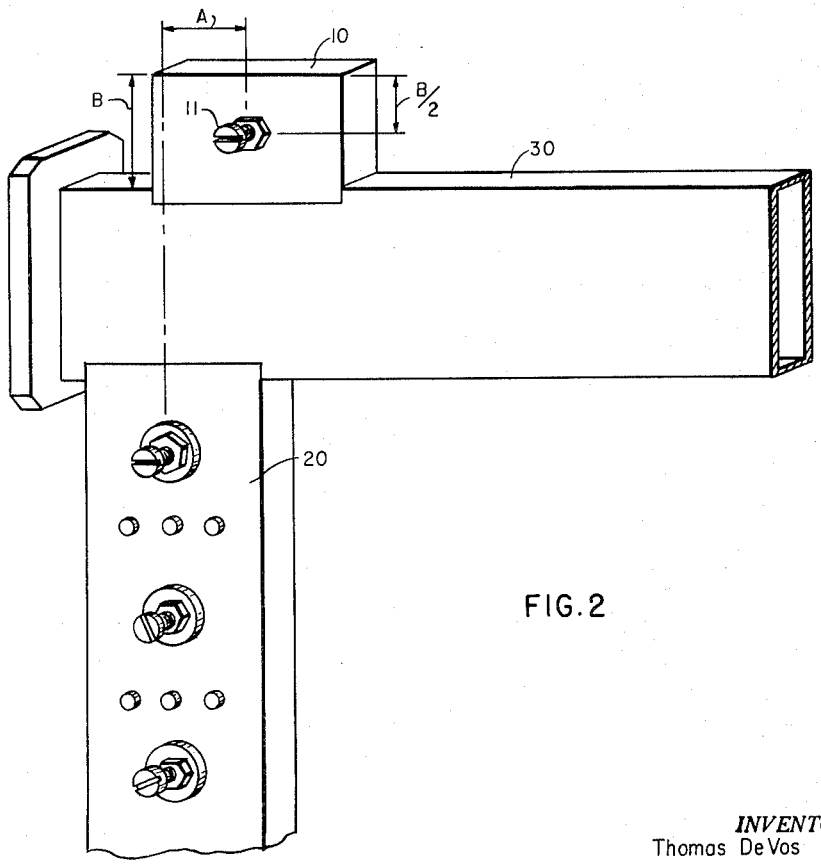
FIG. 2 is a pictorial view of a waveguide matching arrangement.
Figure 3:
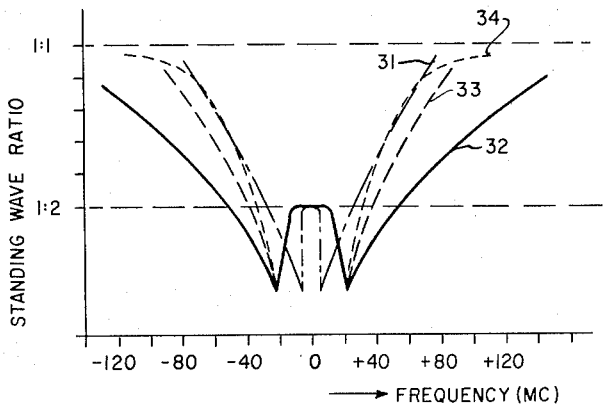
FIG. 3 is a graph that illustrates the results achieved by the addition of a waveguide matching arrangement.

Referring to FIGS. 1 and 2, placing an obstacle or making a hole in a waveguide used for transmission of microwave power causes a certain amount of mismatch. This mismatch is more or less frequency dependent, both with respect to phase and amplitude. The coupling hole to branching filter 20 constitutes such a mismatch to the frequency band or bands which are rejected by the filter. A wide pass band produces a lower Q of the first filter cavity as shown by curves 31 and 32 of the graph in FIG. 3, where curve 31 represents a typical transmission characteristic of a narrow-bandwidth branching filter without the use of a matching device and curve 32 represents a typical transmission characteristic of a wide-bandwidth branching filter without the use of a matching device. When the pass band of the branching filter becomes wider, the mismatch to frequencies outside the pass band also becomes greater. It can be seen that at frequencies outside the pass band for curve 32, which is 20 mc. wide at the 0.1 db points, a certain mismatch is present. At frequencies ±120 mc. from the center frequency the standing wave ratio is approximately 1.36:1. Furthermore when the frequencies outside the pass band are closer to the pass band, a greater mismatch to frequencies outside the pass band occurs.

FIGS. 1 and 2 indicate a typical situation with branching filter 20 placed at a 90° angle with respect to main waveguide 30. To compensate for mismatches, cavity 10 is placed at a distance A, where $A = \lambda g/4$, from the entrance to pass-band filter 20 to match the out-of-band reactance of this filter. Cavity 10 is designed so that its impedance to out-of-band frequencies is equal in amplitude and phase to that of the first cavity in the main filter 20. These mismatches cancel one another as a consequence of the $\lambda g/4$ spacing. These results are indicated by curve 33 of FIG. 3, which represents a typical transmission characteristic of a wide-bandwidth branching filter with the use of a matching cavity.

The main objective is to cancel mismatches outside the pass band, but without influencing, the pass band of main filter 20. The cavity 10, therefore, is trimmed as close as possible to (but without disturbing to any considerable degree) the passband of the main filter 20. Experiments with such a cavity show the validity of this theory.

The distance A, in general, equals $n\lambda g/4$, where $n = \pm 1$, 3, 5, 7 . . . with the center line through the band pass filter. The most practical value of $n$ is either $\pm 1$ or $\pm 3$. Since the reactance X1 should equal the reactance X2 to provide the best possible match, the coupling hole of the matching cavity should be equivalent to the coupling hole of the band-pass filter and the distance B should be equal to $\lambda g/2$.

In order to obtain a simple and effective means of tuning the matching cavity, distance B should be somewhat shorter than $\lambda g/2$, and tuning screw 11 located at a distance of $B/2$ from the back wall of matching cavity 10 is used to tune the cavity to the desired resonant frequency. After the band-pass filter is tuned to the desired characteristic, the resonant frequency of matching cavity 10 is tuned as close as possible to the center frequency of the band pass filter without de-tuning the characteristic of the band-pass filter. This matching arrangement is applicable to any frequency in the microwave region.

Figure 4:
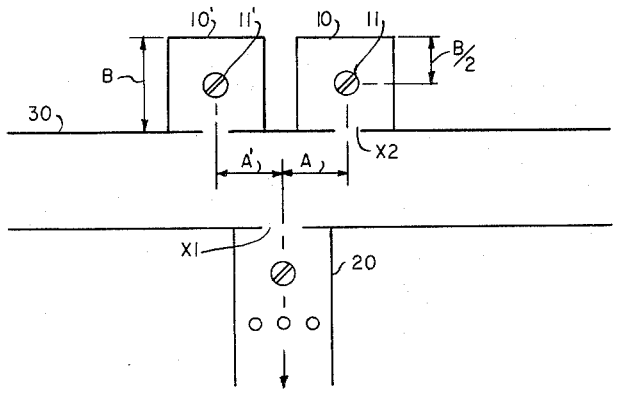
FIGS. 4–6 are symbolic diagrams of alternative embodiments of waveguide matching arrangements.

Another way to construct this matching network, one which has proven to be an improvement over the method just described, is to employ two cavities as shown in FIG. 4. In this case cavities with higher Q should be used, the openings into the matching cavities are smaller than the opening into the branching filter. Here one cavity is used to cancel out mismatches to frequencies on one side of the passband while the second cavity is effective for frequencies at the other side of pass-band. The resulting improved transmission characteristic is shown by curve 34 of FIG. 3.

Figure 5:
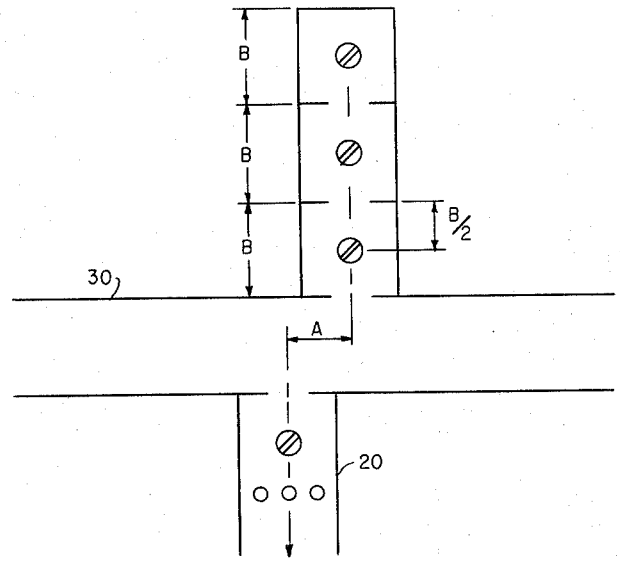
Figure 6:
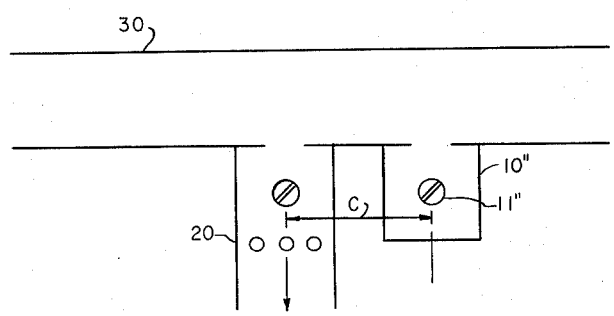

There are many alternate ways to construct this special matching cavity. For example, a considerable shortening of the matching cavity results from filling the cavity with dielectric material. A low-loss dielectric should be used to preserve a reasonably high Q. Furthermore a matching network as shown in FIG. 5 with more than one cavity is more advantageous when very wide-band filters are used. Another technique is to mount the special matching cavity on the same waveguide wall as the branching filter as shown in FIG. 6. The distance C is necessarily 3λ/4 or any larger odd multiple of λ/4 due to physical limitations.

Figure 7:
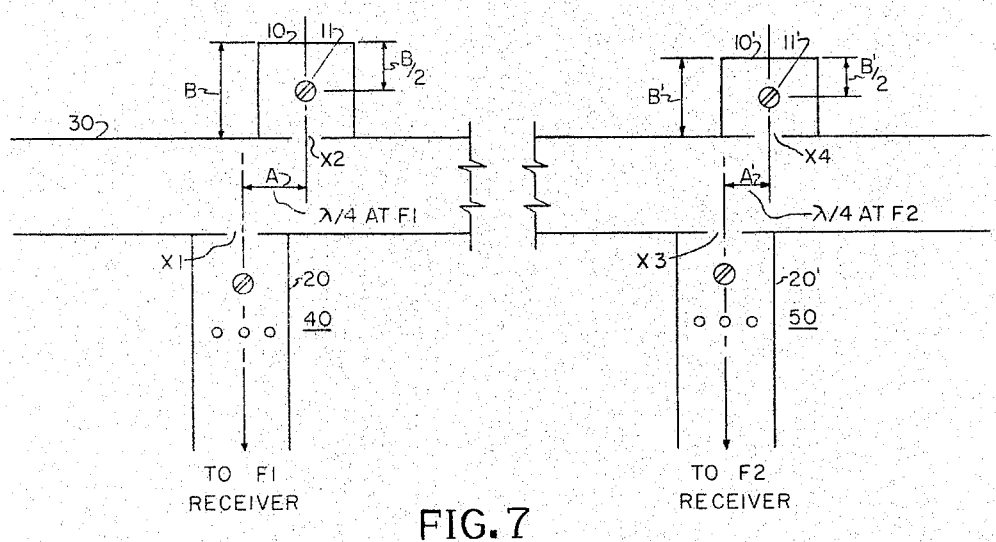
FIG. 7 is a symbolic diagram of two of a plurality of waveguide matching arrangements associated with separate bands of frequencies.

FIG. 7 is an arrangement in which two of a plurality of matched branching networks are shown located along a common waveguide. The matched branching network 40 is identical to the one shown in FIG. 1, and it is associated with the band of frequencies which has center frequency F1. The pass-band filter 20 couples this band of frequencies to the F1 receiver. The dimension A, as has been mentioned previously, is a quarter wave length of the signal at F1, and the dimension B is somewhat less than a half wave length of the signal at F1. The matched branching network 50 is associated with the band of frequencies having center frequency F2, a higher frequency than F1 in the embodiment shown. With a higher middle frequency, the dimension A′ is less than the dimension A and is equal to a quarter wave length of the signal at frequency F2. Similarly, the dimension B′ is somewhat less than a half wave length of the signal at frequency F2. The pass band filter 20′ couples this band of frequencies to the F2 receiver.

A system in which the matching arrangement may be incorporated is shown in the article "A 600-Channel Wideband Microwave System," A. R. Meier, B. A. Pegg, and R. F. White, "Automatic Electric Technical Journal," vol. 8. No. 2, April 1962, at pp. 50–57.

While I have described above the principles of my invention in connection with specific apparatus, it is to be clearly understood that this description is made only by way of example and as a limitation to the scope of my invention.

What is claimed is:

1. In combination, a waveguide for conducting a plurality of bands of frequencies, said waveguide having first and second walls opposite one another with a first coupling aperture in the first wall;
   a pass-band branching filter located exterior to said first wall for selecting one of said bands of frequencies and for passing the selected band of frequencies therefrom, said first aperture providing communication between said waveguide and said filter;
   a second aperture in one of said walls of said waveguide;
   means defining a waveguide cavity located exterior to the last said wall for matching said pass-band filter to said waveguide, said second aperture providing communication between said waveguide and said cavity;
   the axes of said filter and said cavity which extend through said apertures being displaced at a distance of an odd number of quarter guide wave lengths with said distance measured along the waveguide axis;
   said cavity being so tuned that the combination of the filter and cavity provides a match for waves which are rejected by the filter and allows all of said plurality of bands of frequencies other than said selected band of frequencies to be conducted via said waveguide with minimum attenuation.

2. The combination as claimed in claim 1, wherein said means defining a waveguide cavity includes a tuning screw located at a distance of one quarter guide wave lengths from the back wall of said cavity with the longitudinal length of said cavity being a distance of one half guide wave lengths to tune said cavity to the desired resonant frequency.

3. The combination as claimed in claim 2, wherein said first aperture and second aperture are substantially equivalent, thereby making the respective reactances equivalent.

4. The combination as claimed in claim 1, wherein there is provided a plurality of said means defining waveguide cavities, thereby providing a matching arrangement for a branching filter with a relatively wider pass-band.

5. The combination as claimed in claim 1, wherein said second aperture is in said second wall.

6. The combination as claimed in claim 5, further including a third aperture located in said second wall and another means defining a waveguide cavity located exterior to the second wall, said third aperture providing communication between said waveguide and said other cavity, with the axis of said other cavity displaced an odd number of quarter guide wavelengths from the axis of the filter along the waveguide axis.

7. The combination as claimed in claim 6, wherein the axes of said cavities are on opposite sides of the axis of said filter along the waveguide axis, and the cavities are tuned to frequencies near opposite ends of the pass band of the filter.

8. The combination as claimed in claim 1, wherein said second aperture is in said first wall.

9. In a waveguide system using a waveguide for conducting a plurality of bands of frequencies, a plurality of branching filters each coupled to said waveguide for individually selecting each one of said bands of frequencies, and a plurality of receivers individually and directly coupled to each of said filters for receiving the selected band of frequencies from the associated filter,
   the improvement wherein said waveguide has first and second walls opposite one another with a plurality of first coupling apertures in the first wall and a plurality of second coupling apertures in one of said walls, with each of said first apertures displaced from an individually associated second aperture by a distance of an odd number of quarter guide wave lengths with said distance measured along the axis of said waveguide;
   wherein each of said branching filters comprises:
   a pass-band filter coupled to said waveguide via one of said first apertures for selecting a certain one of said bands of frequencies and for passing the selected band of frequencies to an associated receiver; and
   a waveguide cavity coupled to said waveguide via one of said second apertures for matching said pass-band filter to said waveguide so that all of said plurality of bands of frequencies other than said certain band of frequencies is conducted via waveguide with minimum attenuation.

References Cited by the Examiner
UNITED STATES PATENTS 2,588,226  3/52  Fox _____ 333—73
2,931,992  4/60  Caroselli _____ 333—83

HERMAN KARL SAALBACH, *Primary Examiner.*